United States Patent [19]
Christian

[11] Patent Number: 5,858,185
[45] Date of Patent: Jan. 12, 1999

[54] ELECTROLYTIC APPARATUS

[75] Inventor: John Daniel Christian, Wellington, New Zealand

[73] Assignee: Aquagas New Zealand Limited, New Zealand

[21] Appl. No.: 702,707

[22] PCT Filed: Mar. 8, 1995

[86] PCT No.: PCT/NZ95/00026

§ 371 Date: Dec. 5, 1996

§ 102(e) Date: Dec. 5, 1996

[87] PCT Pub. No.: WO95/24519

PCT Pub. Date: Sep. 14, 1995

[30] Foreign Application Priority Data

Mar. 8, 1994 [NZ] New Zealand ............................ 260051

[51] Int. Cl.⁶ ...................................................... C25B 9/00
[52] U.S. Cl. .......................................... 204/272; 204/278
[58] Field of Search ...................................... 204/272, 270, 204/277, 278

[56] References Cited

U.S. PATENT DOCUMENTS

| | | | |
|---|---|---|---|
| 2,375,069 | 5/1945 | Bennett et al. | 62/135 |
| 3,964,991 | 6/1976 | Sullins | 204/275 |
| 3,990,962 | 11/1976 | Götz | 204/272 X |
| 4,175,026 | 11/1979 | Houseman | 204/272 |
| 4,457,816 | 7/1984 | Galluzzo et al. | 204/105 R |
| 5,082,544 | 1/1992 | Willey et al. | 204/270 |
| 5,450,822 | 9/1995 | Cunningham | 204/272 X |

FOREIGN PATENT DOCUMENTS

| | | |
|---|---|---|
| 0 101 193 A2 | 2/1984 | European Pat. Off. . |
| 961 125 | 6/1964 | United Kingdom . |
| 1 136 052 | 12/1968 | United Kingdom . |
| 1 278 591 | 6/1972 | United Kingdom . |
| 2 270 749 | 3/1994 | United Kingdom . |

*Primary Examiner*—Donald R. Valentine
*Attorney, Agent, or Firm*—Pravel, Hewitt & Kimball

[57] ABSTRACT

The invention is directed to a cell for an electrolytic apparatus which comprises a pressure vessel containing a self-contained electrode unit. The electrode unit has an inlet for the supply of electrolyte and an outlet for liberated ad-mixed hydrogen and oxygen gas. The electrode unit further having plurality of spaced-apart concentric cylindrical electrodes and a pair of internal end plates provided at each end of the concentric cylinders. At least one of the internal end plates includes the electrolyte inlet and/or gas outlet. The pressure vessel comprises a cylindrical outer shell having planar transverse end plates which are connected at or adjacent to the opposed ends of the cylindrical outer shell. The pressure vessel being capable of withstanding explosions of stored liberated gas.

20 Claims, 3 Drawing Sheets

ELECTROLYTIC APPARATUS

BACKGROUND

(i) Field of the Invention

This invention relates to the provision of electrolytic apparatus and, in particular, although not necessarily solely, electrolytic apparatus suitable for welding.

(ii) Description of the Prior Art

Conventional electrolytic apparatus has been made to manufacture hydrogen and oxygen from water. One use of such hydrogen oxygen production is in welding equipment to replace the convention oxyacetylene mixture for gas welding. Many other uses of the hydrogen oxygen will be apparent to those skilled in the art. However, the provision of welding equipment based on the hydrolysis of water into hydrogen and oxygen can have special problems.

Existing prior art hydrolysis equipment has included conventional horse shoe cells as well as cells utilising plates within a generally rectangular cell and the use of membranes between the plates such that the hydrogen and oxygen are separated within the cell. Such membranes often comprise silk, polyester woven cloth or a variety of other plastic membranes between adjacent electrode plates that allow charge to transfer from one plate to another and yet inhibit the free flow of gas bubbles within the solution.

The use of such cells allows the separation of the hydrogen and oxygen from its point of formation and the hydrogen and oxygen may be maintained in separate conduits throughout the apparatus until its necessary combination at the head of the welder or similar apparatus.

The use of such technology involves complex manufacture in the use of the impermeable membranes, a greater degree of maintenance and also less efficient gas production than other configurations. In particular, the use of concentric cylindrical electrodes within a cell allows more efficient gas production, however, there are manufacturing difficulties in providing impermeable membranes or other separators to avoid the production of a mixed hydrogen and oxygen gas within the cell.

Gas produced from concentric cylindrical electrodes may be used in its mixed form as produced or later separated into hydrogen and oxygen components. In either case, it is difficult to avoid the production of the mixed hydrogen and oxygen gas within the cell itself. Therefore, it is necessary to incorporate adequate safety measures against explosion of the volatile hydrogen and oxygen mix within the cell should a fault cause ignition to occur within the cell.

A further problem encountered with such welding apparatus is that the generation of hydrogen and oxygen by the hydrolysis process causes some saturated water vapour to leave the generating cells with the gases. This may typically be a value of say three percent by volume and in the case of combustion such as is required with welding apparatus, the saturated water vapour may have the effect of reducing the flame temperature from 3000° C. to 2,500° C. The saturated water vapour within the generated gas can also provide other problems such as condensation in reticulation systems and corrosion of safety devices.

(iii) OBJECT OF THE INVENTION

Therefore, it is an object of the present invention to provide a cell for the containment of an electrolytic cell which overcomes many of the disadvantages of the prior art and provides advantages unknown so far. It is also an object of the invention to at least provide the public with a useful choice.

Furthermore, it is an object of at least an aspect of the invention to provide a gas drying apparatus which overcomes many of the disadvantages of the prior art and provides advantages unknown so far. It is also an object of the invention to provide the public with a useful choice.

(iv) SUMMARY OF THE INVENTION

Accordingly, in a first aspect, the invention may broadly be said to consist in a cell for electrolytic apparatus wherein said cell is a pressure cell containing a plurality of concentric cylindrical electrodes spaced apart by insulators and at least one end plate provided at an end of said concentric cylinders and including apertures to permit fluid and gas flow between said cylinders; and wherein said pressure cell comprises a cylindrical outer shell having planar transverse end plates connected at or adjacent opposed ends of said cylindrical outer shell.

In a further aspect, the invention may broadly be said to consist in a gas drying apparatus comprising a drying chamber; an inlet valve into said drying chamber wherein said drying chamber is of greater cross section than an aperture of said value and wherein said drying chamber further includes a stranded condensation surface which will allow gas to pass through apertures between strands of said surface and the strands of the surface providing a surface area for the condensation of the water vapour.

Other aspects of this invention which should be considered novel will become apparent from the following description.

(v) BRIEF DESCRIPTION OF THE DRAWINGS

The invention will now be described with reference to the following drawings in which.

(vi) DETAILED DESCRIPTION OF PREFERRED EMBODIMENTS

Figure 1:
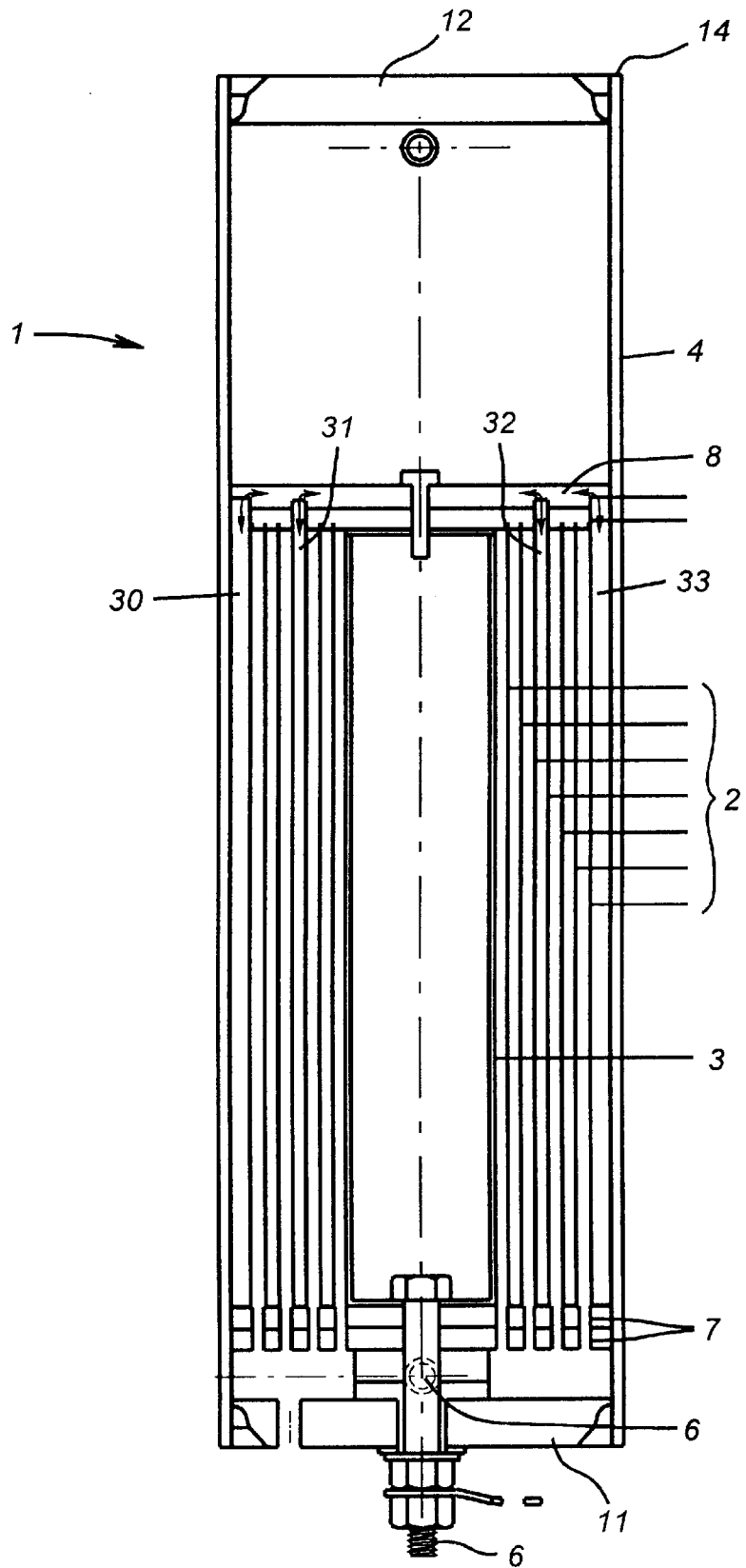
FIG. 1 is a cross sectional elevation through a pressure cell in accordance with one embodiment of this apparatus.

Referring to the drawings, one aspect of this invention comprises a pressure cell 1 containing an electrolytic apparatus in the form of a series of concentric cylinders 2 nested within each other. The cylinders 2 act as electrodes within the electrolytic cell and an electrolyte such as potassium hydroxide may be used in conjunction with the cylinders. The inner most cylinder 3 and the outer most cylinder 4 may act as the external electrodes for the apparatus. As can be seen in FIG. 1, the internal cylinder 3 is connected via connecting bolt 6 to the outside of the pressure cell to provide this electrode with a connection point external of the pressure cylinder.

When electrolytic apparatus of this type is used for the production of hydrogen and oxygen for subsequent combustion as in welding apparatus or the like, safety measures must be incorporated to ensure that the apparatus does not explode from ignition within the electrolytic cell itself. In most forms this would be through the provision of a number of safety devices to prevent ignition within the electrolytic cell. In apparatus of the type of the present invention, this may be difficult to achieve or expensive. The invention is based on a different, and even reversed, approach to the problem. This approach is to prevent a fault ignition causing any damage rather than to prevent ignition itself to occur. Therefore, the present invention seeks to provide a pressure cell which can safely contain ignition within the pressure cell itself. To this end, the pressure cell 1 is designed to withstand internal pressures in the order of 1000 PSIG even though the normal operating pressure of the cell itself is only in the order of 20 to 45 PSIG with a maximum working pressure of 50 PSIG. A cell designed to meet British standard 5500 is suitable.

For the electrolytic cell to operate efficiently, the concentric cylinders are self contained as a unit, and should be equally spaced apart by insulating members and provided with end caps on the electrodes 7 and 8 which support the electrodes and inhibit, viz., increase the path length of, the flow of fluid from within each cell between adjacent cylinders to any cell other than the directly adjacent cell. This may be provided by the provision of channels and baffles within the end caps 7 & 8. The channels 30–33 in FIG. 1 illustrate the longer path length between two pairs of electrodes with respect to the distance between adjacent electrodes. Similar channels are provided for other ones of the pairs, although cannot be seen in the particular cross-sectional view of FIG. 1. This arrangement provides the maximum flow path throughout the apparatus as a whole and prevent the short circuiting of flow between non adjacent cells.

To provide such an arrangement, it is necessary to provide an outer pressure cell 1 which provides planar transverse end plates as opposed to the conventional dome shaped ends on conventional pressure cells. These end plates 11 and 12 may be mounted adjacent ends 13 and 14 respectively of the outer shell 4 of the pressure cell 1.

To accommodate the pressures possible following ignition within the pressure cell 1, the outer shell 4 may be constructed from schedule 20 steel pipe and the end plates 11 and 12 constructed from steel boiler plate such as 25 mm thick boiler plate or, preferably, at least a thickness of greater than 20 mm.

Figure 2:
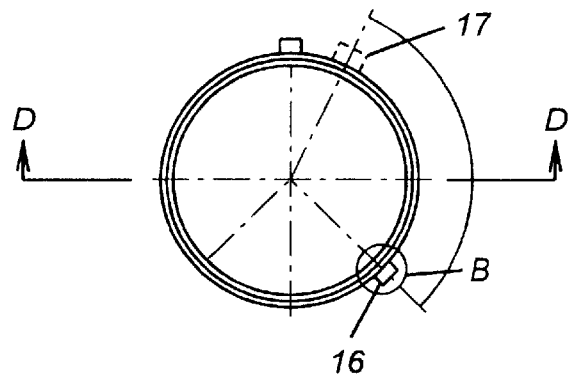
FIG. 2 is a plan view of the pressure cell of FIG. 1.
Figure 3:
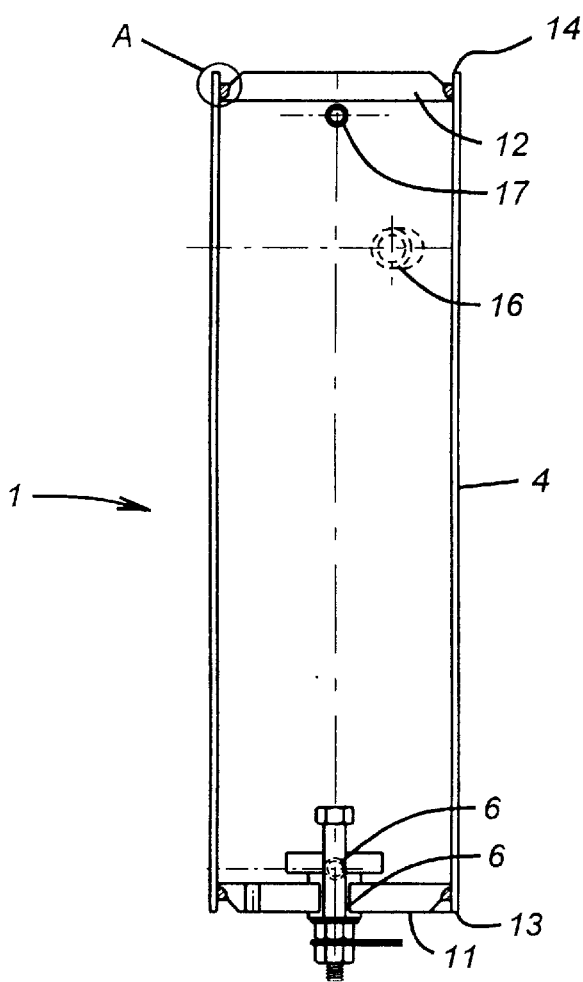
FIG. 3 is a cross sectional elevation through cross section D—D of FIG. 2 and omitting the electrolytic cylinders for clarity.

As shown in FIGS. 2 and 3, the pressure cell must also accommodate filler points 16 and other sockets 17 for inlets and outlets into the pressure vessel itself. These must also accommodate the pressures exerted by ignition within the cell to ensure that the sockets themselves do not detach in such a circumstance.

Figure 4:
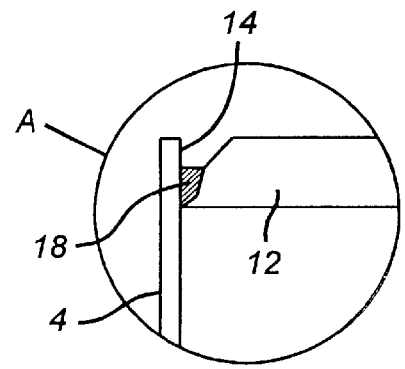
FIG. 4 is a partial cross sectional elevation showing detail A of FIG. 3.

Referring specifically to FIG. 4, the end plates such as end plate 12 may be placed within the confines of the outer casing 4 adjacent to the end 14. A welded connection 18 may be provided to connect the end plate 12 to the wall 4 of the pressure cylinder 1. It has been found that a weld to approximately half the depth of the end plate 12 will operate satisfactorily in maintaining a connection between the cylinder wall 4 and the end plate 12 even upon ignition within the pressure cell.

Figure 5:
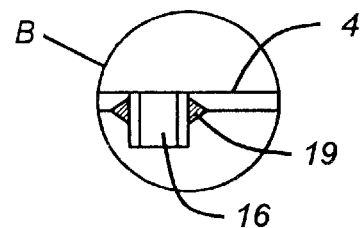
FIG. 5 is a partial cross sectional view of detail B of FIG. 2.

Referring to FIG. 5, heavy duty sockets to accommodate filling of the pressure vessel may also be provided with welded connections 19 about the entire circumference of the socket 16 to provide a secure connection between the socket 16 and the wall 4 of the pressure vessel 1.

Within the electrolytic cell, the potassium hydroxide used as an electrolyte is corrosive and to avoid degradation of the steel components, steel nickel plating may be provided throughout. Alternatively, some special grades of stainless steel may also suit. The provision of the steel nickel plating not only inhibits corrosion from the potassium hydroxide but also aids in electrical conduction.

The insulating components within the cell or any other non metallic components used within or in conjunction with the cell may be constructed from high molecular weight polyethylene and, more preferably, ultra high molecular weight polyethylene or nylon 11.

A concentric cell of this type is capable of high efficiency gas generation. On a typical cell constructed in accordance with this invention, an input of 34 volts and 250 amps has a theoretical gas production of 4 cubic metres per hour. This is on a specific plate area and other constraints determining the theoretical production of the cell. In practice, an actual production of 3.6 cubic metres per hour has been possible.

Such an example of gas generation is repeated on a similar cell at different currents and it has been found that an input current of 200 amps provides a theoretical production of 3.2 cubic metres per hour and an actual production of 2.88 cubic metres per hour.

Thus it can be seen that the actual production from cells in this arrangement can be excess of 90 percent of the theoretical gas production calculated on plate areas, etc.

Figure 6:
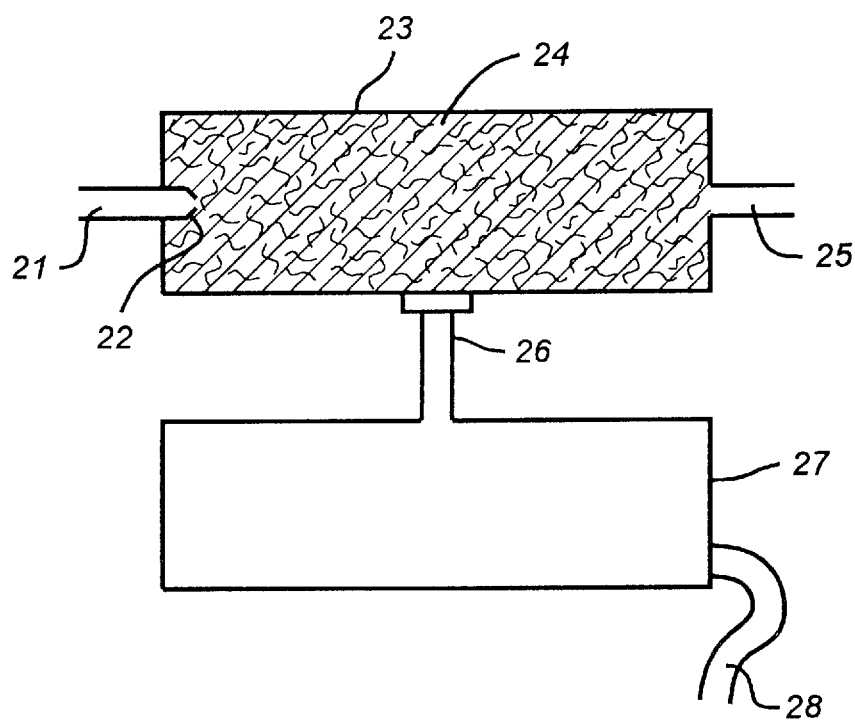
FIG. 6 is a cross sectional view through a gas drying apparatus in accordance with a further embodiment of this invention.

In another aspect of this invention, a gas drying apparatus is provided as shown in FIG. 6.

The hydrogen and oxygen mixture from the electrolysis is provided through a supply pipe or similar 21 through an inlet valve or nozzle 22 to the drying chamber 23. The use of a high velocity increase in the gas via the small aperture provided in the valve 22 and the outlet to the much larger chamber 23 will cause condensation of much of the water vapour contained within the gas stream.

In addition, the drying chamber 23 can contain a stranded condensation surface 24 intermediate of the inlet 22 and the outlet 25 from the drying chamber 23. This stranded condensation surface 24 will provide further cooling and a surface on which the heavy water molecules can collect and thereby provide further drying of the gas as it moves through the chamber 23.

The stranded condensation surface 24 may be a fibrous artificial wool and a stainless steel wool has been found to be particularly suitable. Amongst other advantages, the stainless steel wool will not corrode in the gas stream and also provides a function as a flame arrester as an additional safety point. Condensation collected within the drying chamber 23 may be drained through the drain 26 to a conventional water collection tank 27. The water so collected may then be returned through an outlet 28 to the remainder of the apparatus for further electrolysis.

In keeping with the electrolytic cells themselves, the drying chamber 23 may comprise a pressure vessel constructed to British standard 5500 to accommodate ignition of the gas within the cell. In this instance, the pressure cell 23 may be of any convenient shape including a dome ended pressure cell.

Thus it can be seen that a pressure cell for the housing of the electrolytic apparatus is provided which may conform to British standard 5500 and accommodate potential ignition within the pressure cell while providing planar transverse ends to the pressure cell for the easy accommodation of the concentric cylinders arranged as part of the cell apparatus.

Furthermore, a gas drying apparatus is provided to remove water vapour from the resultant gas stream to improve the operation of the apparatus in its preferred intended use as a welding apparatus.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope or spirit of the invention as defined in the appended claims.

I claim:

1. A cell for electrolytic apparatus comprising a pressure vessel, said pressure vessel comprising:

a self-contained electrode unit having an inlet for the supply of electrolyte and an outlet for liberated admixed hydrogen and oxygen gas, said electrode unit having a plurality of spaced-apart concentric cylindrical electrodes and a pair of internal end plates provided at each end of said concentric cylindrical electrodes, at least one of said internal end plates including said electrolyte inlet and/or said gas outlet, and a cylindrical outer shell having planar transverse end plates connected at or adjacent opposed ends of said cylindrical outer shell, said pressure vessel capable of withstanding explosions of the liberated gas stored therewithin.

2. The cell of claim 1, wherein at least one of said internal end plates includes duct means for communicating the electrolyte between said concentric cylindrical electrodes by a circuitous path of a length longer than between adjacent said electrodes.

3. The cell of claim 1, wherein said cylindrical outer shell and said transverse end plates are made from steel.

4. The cell of claim 3, wherein said transverse end plates are positioned slightly within said outer shell and welded into connection with said outer shell.

5. The cell of claim 4, wherein said cylindrical outer shell comprises a length of schedule 20 steel pipe.

6. The cell of claim 5, wherein said transverse end plates comprise steel plate of a thickness greater than or equal to 20 mm.

7. The cell of claim 6, wherein said transverse end plates are welded to said outer shell to a depth of substantially half the thickness of said transverse end plate.

8. The cell of claim 1, further comprising a cell port and a gas drying apparatus receiving the stored liberated gas from said cell port, said gas drying apparatus comprising:

a drying chamber;

an inlet valve into said drying chamber, said inlet valve having an aperture;

wherein said drying chamber is of greater cross section than said inlet valve aperture; and a stranded condensation surface having openings therethrough, said stranded condensation surface allowing gas to pass through said openings and providing a surface area for the condensation of water vapor.

9. The cell of claim 8, wherein said stranded condensation surface comprises a fibrous artificial wool.

10. The cell of claim 8, wherein said stranded condensation surface comprises stainless steel wool.

11. The cell of claim 8, wherein said stranded condensation surface additionally acts as a flame arrester.

12. A cell for electrolytic apparatus comprising a pressure vessel, said pressure vessel comprising:

a self-contained electrode unit having an inlet for the supply of electrolyte and an outlet for liberated admixed hydrogen and oxygen gas, said electrode unit having a plurality of spaced-apart concentric cylindrical electrodes and a pair of internal end plates provided at each end of said concentric cylindrical electrodes, at least one of said internal end plates including said electrolyte inlet and/or said gas outlet and at least one of said internal end plates including duct means for communicating the electrolyte between said concentric cylindrical electrodes by a circuitous path of a length longer than between adjacent said electrodes, and a cylindrical outer shell having planar transverse end plates connected at or adjacent opposed ends of said cylindrical outer shell, said cylindrical outer shell and said transverse end plates are made from steel, said pressure vessel capable of withstanding explosions of the liberated gas stored therewithin.

13. The cell of claim 12, wherein said transverse end plates are positioned slightly within said outer shell and welded into connection with said outer shell.

14. The cell of claim 13, wherein said cylindrical outer shell comprises a length of schedule 20 steel pipe.

15. The cell of claim 14, wherein said transverse end plates comprise steel plate of a thickness greater than or equal to 20 mm.

16. The cell of claim 15, wherein said transverse end plates are welded to said outer shell to a depth of substantially half the thickness of said transverse end plate.

17. The cell of claim 12, further comprising a cell port and a gas drying apparatus receiving the stored liberated gas from said cell port, said gas drying apparatus comprising:

a drying chamber;

an inlet valve into said drying chamber, said inlet valve having an aperture;

wherein said drying chamber is of greater cross section than said inlet valve aperture; and a stranded condensation surface having openings therethrough, said stranded condensation surface allowing gas to pass through said openings and providing a surface area for the condensation of water vapor.

18. The cell of claim 17, wherein said stranded condensation surface comprises a fibrous artificial wool.

19. The cell of claim 17, wherein said stranded condensation surface comprises stainless steel wool.

20. The cell of claim 17, wherein said stranded condensation surface additionally acts as a flame arrester.

* * * * *